United States Patent [19]

Janik et al.

[11] Patent Number: 4,801,642

[45] Date of Patent: Jan. 31, 1989

[54] THERMALLY STABLE ORGANOSILOXANE COMPOSITIONS AND METHOD FOR PREPARING SAME

[75] Inventors: Gloria Janik, Midland; Manuello Buentello, III, Thomas Township, Saginaw County, both of Mich.

[73] Assignee: Dow Corning Corporation, Midland, Mich.

[21] Appl. No.: 138,414

[22] Filed: Dec. 28, 1987

[51] Int. Cl.$^4$ .............................................. C08K 5/16
[52] U.S. Cl. .................................... 524/714; 524/214; 524/251; 524/252; 525/478; 528/15; 528/31; 528/32
[58] Field of Search ........................... 528/15, 31, 32; 525/478; 524/714, 251, 252

[56] References Cited

U.S. PATENT DOCUMENTS

| | | | |
|---|---|---|---|
| 3,020,260 | 2/1962 | Nelson | 528/15 |
| 3,867,343 | 2/1975 | Garden | 528/15 |
| 4,281,093 | 7/1981 | Garden | 528/15 |
| 4,374,967 | 2/1983 | Brown et al. | 528/15 |
| 4,584,361 | 4/1986 | Janik et al. | 528/15 |

*Primary Examiner*—Melvyn I. Marquis
*Attorney, Agent, or Firm*—Robert Spector

[57] ABSTRACT

Small amounts, typically from about 0.001 to about 0.05 percent by weight, of certain aliphatic and cycloaliphatic mono-, di- and triamines have been shown to retard the heat-induced discoloration to materials prepared by curing unfilled organosiloxane compositions comprising a specified class of vinyl-substituted polyorganosiloxanes, an organohydrogensiloxane and a platinum-containing hydrosilation catalyst. Preferred amines will also function as platinum catalyst inhibitors, and impart long term storage stability to these curable organosiloxane compositions when packaged in a single container.

6 Claims, No Drawings

THERMALLY STABLE ORGANOSILOXANE COMPOSITIONS AND METHOD FOR PREPARING SAME

BACKGROUND OF THE INVENTION

1. Field of the Invention

This invention relates to thermally stable organosiloxane compositions. More particularly, this invention relates to unfilled organosiloxane compositions that cure by a platinum catalyzed hydrosilation reaction to yield materials exhibiting a resistance to heat-induced discoloration during long-term exposure to temperatures of up to 200° C.

2. Description of the Prior Art

Polyorganosiloxane compositions which cure by means of a platinum catalyzed hydrosilation reaction to form silicone gels are disclosed, for example, in U.S. Pat. No. 3,020,260, issued to Nelson on Feb. 6, 1962, and in U.S. Pat. No. 4,374,967, issued to Brown, Lee and Maxson on Feb. 22, 1983. The gels described by Nelson are obtained by reacting an organosiloxane containing two silicon-bonded hydrogen atoms per molecule with a vinyl-containing copolymer wherein the repeating units are of the formulae $RViSiO$, $R_2SiO$, and $(CH_3)R_2SiO_{0.5}$, where R is methyl or phenyl and Vi represents vinyl.

The vinyl-containing copolymers disclosed by Brown et al. consist essentially of $(CH_3)_2SiO$, $(CH_3)_3SiO_{0.5}$ and $(CH_3)_2ViSiO_{0.5}$ where Vi again represents vinyl, and are reacted with an organohydrogensiloxane having more than one silicon-bonded hydrogen atom per molecule.

U.S. Pat. No. 4,584,361, which issued to Janik and Lo on Apr. 22, 1986 teaches the use of a platinum catalyst inhibitor of the general formula $R_2^1NR^3NR_2^2$ or $R^4NH_2$ in an amount sufficient to impart long term storage stability at temperatures of up to 70° C. to a one-part unfilled polyorganosiloxane gel composition that cures by a platinum-catalyzed hydrosilation reaction. In these formulae each $R^1$ is individually selected from the group consisting of alkyl radicals containing from 1 to 4 carbon atoms, $R^2$ is $R^1$ or hydrogen, $R^3$ represents an alkylene radical containing from 2 to 4 carbon atoms, and $R^4$ represents an alkyl radical containing from 2 to 4 carbon atoms. Surprisingly the inhibitor does not substantially retard the cure rate of the composition at temperatures above about 80° C.

The use of ammonia, amines, and other nitrogen-containing compounds as inhibitors for the platinum catalyzed reaction of silicon-bonded hydrogen atoms with silicon-bonded hydroxyl groups is taught in U.S. Pat. No. 3,867,343, issued to Garden on Feb. 18, 1975. U.S. Pat. No. 4,281,093, issued to Garden on July 28, 1981, discloses using these inhibitors for the reaction of polyorganohydrogensiloxanes with polyorganosiloxanes containing silicon-bonded vinyl or allyl radicals. The catalysts for the reaction are organic complexes of platinum or rhodium. Neither metallic platinum nor reaction products of platinum compounds with organosilicon compounds are mentioned as catalysts suitable for use with these amine inhibitors.

A shortcoming of the compositions disclosed in the aforementioned Nelson and Brown et al. patents is the tendency of the initially clear and colorless cured materials prepared from these compositions to darken when exposed to temperatures from 100° to about 200° C. for extended periods of time. In addition to being aesthetically unattractive the darkening may adversely affect the utility of the compositions if transparency and the absence of discoloration are requirements.

The present inventors have now discovered that the addition to curable compositions disclosed in the aforementioned Nelson and Brown et al. patents of less than 1 percent by weight of certain aliphatic and cycloaliphatic amines, including the platinum catalyst inhibitors of the aforementioned U.S. Pat. No. 3,867,343 to Garden and the relatively small group of amines disclosed as platinum catalyst inhibitors for the compositions claimed in the aforementioned Janik and Lo patent, imparts a resistance to heat-induced discoloration to these compositions in cured form. This effect is not observed when aliphatic and cycloaliphatic mono-amines are added to curable organosiloxane compositions containing a vinyl-substituted polydiorganosiloxane in place of the vinyl-containing polyorganosiloxanes disclosed in the aforementioned Nelson and Brown et al. patents.

SUMMARY OF THE INVENTION

The present invention is based on the discovery that small amounts of aliphatic or cycloaliphatic amines are unique with respect to their ability to impart heat stability to cured materials prepared using the curable organosiloxane compositions disclosed in the aforementioned Brown et al. patent.

DETAILED DESCRIPTION OF THE INVENTION

This invention provides a method for imparting resistance to heat-induced discoloration to a cured unfilled organosiloxane material prepared from a curable composition comprising the product obtained by blending to homogeneity (A) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2\!=\!CH)SiO_{0.5}$ units;

(B) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogen atoms per silicon-bonded vinyl radical present in said composition; and (C) a platinum catalyst in an amount sufficient to promote the reaction of (A) and (B), where said platinum catalyst is metallic platinum or a reaction product of a platinum compound and an organosilicon compound; said method comprising adding to said curable composition at least one amine of the formula $R_nNH_{(3-n)}$, $H_2NR''NH_2$, $R'_2NR''NR'_2$ or $H_2NR''N(H)R''NH_2$ in an amount sufficient to inhibit heat-induced discoloration of said cured organosiloxane material at temperatures of up to about 200° C., where each R is individually selected from alkyl radicals and cycloalkyl radicals, R' represents an alkyl radical, R'' represents alkylene and the value of n is 1, 2 or 3.

This invention also relates to curable compositions containing the aforementioned ingredients A, B, C and an amine corresponding to the formula $R_mNH_{3-m}$, $H_2NR''NH_2$ or $H_2NR''N(H)R''NH_2$, where R and R'' are defined hereinabove and the value of m is 2 or 3.

The characterizing feature of the present invention is the ability of small amounts of aliphatic mono-, di- and triamines to function as heat stabilizers by imparting a resistance to heat-induced discoloration to unfilled cured organosiloxane materials prepared using a specified class of vinyl-containing polyorganosiloxanes. One class of suitable amines can be represented by the formula $R_nNH_{3-n}$. The hydrocarbon radicals, represented by R in this formula are alkyl or cycloalkyl. A second class of amines are diamines represented by the formula $H_2NR''NH_2$ or $R'_2NR''NR'_2$ where R' represents an alkyl radical and R'' represents an alkylene radical. The third class of amines are triamines represented by the formula $H_2NR''N(H)R''NH_2$. In these formulae the alkyl radicals represented by R and R' preferably contain from 1 to 4 carbon atoms, the cycloalkyl radical represented by R is preferably cyclohexyl and the alkylene radical represented by R'' is preferably ethylene or propylene.

The class of amines claimed in the aforementioned Janik and Lo patent (U.S. Pat. No. 4,584,361) is particularly preferred, based on the ability of these amines to also function as platinum catalyst inhibitors that impart long term storage stability at temperatures up to 70° C. to one-part curable compositions containing the aforementioned ingredients A, B and C without adversely affecting the ability of these compositions to cure rapidly at temperatures above about 80° C.

The concentration of amine heat stabilizer in the present conmpositions is typically less than one percent, based on the weight of the present curable composition. This value is preferably from 0.001 to 0.05 percent. Applicants have discovered that when the concentration of amine exceeds about 0.05 percent the discoloration exhibited by the cured gel at temperatures above about 100° C. approaches or exceeds that of a composition that does not contain any heat stabilizer.

The present amines are effective heat stabilizers only in unfilled compositions containing a vinyl-substituted polyorganosiloxane having the repeating units defined hereinabove for ingredient A. This class of compositions includes some of those described in the aforementioned U.S. Pat. No. 4,374,967 to Brown et al., issued on Feb. 22, 1983.

The compositions of Brown et al. that can be stabilized against heat induced discoloration using the present amines consist essentially of (A) an organosiloxane copolymer consisting essentially of from 80 to 96.5 mol % of $(CH_3)_2SiO$ units, from 2.0 to 10.0 mol % of $CH_3SiO_{1.5}$ units, from 1.25 to 6.0 mol % of $(CH_3)_3SiO_{0.5}$ units and from 0.25 to 4.0 mol % of $(CH_3)_2(CH_2=CH)SiO_{0.5}$ units, and (B) an organohydrogensiloxane containing an average of two silicon-bonded hydrogen atoms per molecule, no more than one hydrogen atom on any silicon atom and organic radicals selected from alkyl containing from 1 to 6 carbon atoms, phenyl and 3,3,3-trifluoropropyl.

The concentration of organohydrogensiloxane is sufficient to provide from 0.7 to 1.2 silicon-bonded hydrogen atoms per vinyl radical present in the vinyl-containing organosiloxane copolymer referred to hereinbefore as ingredient A. The composition also contains an amount of a platinum catalyst sufficient to promote the reaction of ingredients A and B.

Vinyl-containing organosiloxane copolymers corresponding to ingredient A are well known. Preparation of these copolymers is described in the examples of the aforementioned Brown et al. patent which is incorporated herein in its entirety by reference as a teaching of a preferred class of vinyl-containing organosiloxane copolymers suitable for use in the present compositions.

These copolymers can be prepared by cohydrolysis of the corresponding methylchlorosilanes in the presence of a suitable acid acceptor. The resultant mixture is then reacted with the required amount of $(CH_3)_2(CH_2=CH)SiCl$ or a hydrolysis product thereof to form the polyorganosiloxane referred to as ingredient A.

Alternatively, ingredient A can be prepared by equilibration of the corresponding siloxane polymers in the presence of an equilibration catalyst such as potassium silanolate. This alternative method is usually the preferred one.

Preferred organosiloxane copolymers contain from 87 to 94 mole percent of dimethylsiloxane units, from 3 to 6 mole percent monomethylsiloxy units, from 2.5 to 5 mole percent of trimethylsiloxy units and from 0.5 to 1 mole percent of dimethylvinylsiloxy units.

In the presence of a platinum hydrosilation catalyst, the vinyl radicals in ingredient A react with the organohydrogensiloxane (ingredient B) to form a cured gel-like material. Ingredient B contains at least two silicon-bonded hydrogen atoms per molecule that can be located on any of the silicon atoms of ingredient B. If only two silicon-bonded hydrogen atoms are present, they are preferably located at the terminal silicon atoms of a polydiorganosiloxane. The organic radicals present on ingredient B can be one or more of alkyl containing from one to six carbons, phenyl or 3,3,3-trifluoropropyl. To ensure the compatibility of ingredient B with the remaining ingredients of the present curable compositions, the organic radicals are preferably methyl.

Preferred embodiments of ingredient B include one or more of methylhydrogensiloxane and/or dimethylhydrogensiloxy units in combination with trimethylsiloxy, $CH_3SiO_{1.5}$ dimethylsiloxane and/or $SiO_2$ units. One preferred embodiment of ingredient B is a dimethylhydrogensiloxy endblocked polydimethylsiloxane containing from 1 to 30 dimethylsiloxane units per molecule. A second preferred embodiment contains trimethylsiloxy, dimethylsiloxane and methylhydrogensiloxane units, and an average of from 4 to 20 silicon atoms per molecule.

The concentration of ingredient B is sufficient to provide from 0.7 to 1.2 silicon-bonded hydrogen atoms per vinyl radical present in ingredient A. Below this range there are an insufficient number of these hydrogen atoms to completely cure the composition, while above this range hydrogen gas may be generated during curing and/or storage of the composition.

Platinum catalysts suitable for use in the present compositions include metallic platinum and reaction products of platinum compounds with organosilicon compounds. These catalysts effectively promote the reaction between silicon-bonded hydrogen atoms and vinyl radicals, and include the chloroplatinic acid catalysts described in U.S. Pat. No. 2,823,218, issued on Feb. 11, 1958, to Speier et al., and the reaction products of chloroplatinic acid and an organosilicon compound such as those described by Willing in U.S. Pat. No. 3,419,593, issued Dec. 31, 1968.

For any particular platinum catalyst selected, the skilled practitioner will be able to determine an optimum amount to promote curing. Platinum catalysts have been used effectively in amounts sufficient to provide from about 0.1 to 40 parts by weight of platinum per million parts by weight, of total curable composition. The present inventors found the particular platinum catalyst described in Example 1 of the aforementioned patent to Willing, supra, to be particularly effective when employed so as to provide between 5 and 10 parts by weight of platinum per million parts by weight of the total formulation.

The curable compositions of this invention are typically prepared by blending the foregoing ingredients A and B and C, at least one of the present amines and an optional platinum catalyst inhibitor to form a homogeneous composition. The inhibitor allows the composition to be stored under ambient conditions for a period of several days up to several weeks, depending upon the type and concentration of inhibitor. As discussed hereinabove, the present heat stabilizers include but are not limited to the amines disclosed as effective platinum catalyst inhibitors in the aforementioned Janik and Lo patents.

When it is desired to cure a composition containing a platinum catalyst inhibitor the composition is heated at a temperature of 80° C. or above until the desired degree of curing has been achieved. The degree of curing is conveniently determined by measuring the distance which a penetrometer probe of known weight penetrates into the gel during a specified period of time.

For preferred cured compositions of this invention this value is from 3 to 7.5 mm. using a combined probe and plunger weight of 19.5 g. applied for five seconds. The curing temperature is preferably at least 120° C. to achieve curing in 15 minutes or less using the preferred inhibitor.

A characteristic feature of at least some of the curable compositions containing as heat stabilizers the amines disclosed in the aforementioned Janik and Lo patent is the occurrence of a relatively small increase in viscosity during the first seven days of storage. The total increase amounts to about 10 percent of the initial viscosity. Following this initial increase the viscosity of the composition remains substantially constant throughout the remainder of the storage period, which can be up to ten months or longer.

The gels obtained by curing the organosiloxane compositions of this invention are useful as potting compounds and conformal coatings. The compositions are particularly useful for encapsulating electronic circuits containing semiconductor devices that are susceptible to damage by moisture or other contaminants present at locations where the circuits are installed. The structural integrity of preferred gel compositions is not adversely affected at temperatures as low as $-120°$ C.

The following example demonstrates the unique properties of representative heat stabilizers with respect to their chemical composition and the polyorganosiloxane materials that can be stabilized using these amines. The example should not be interpreted as limiting the scope of the present invention as defined in the accompanying claims. All parts and percentages in the example are by weight unless otherwise specified.

EXAMPLE

This example demonstrates the specificity of the present amines as heat stabilizers for organosiloxane compositions of this invention, the low amine concentrations at which this effect is observed and the adverse effect on heat stability of using an excess of the present amines.

A number of amines were evaluated as heat stabilizers by blending them together with a polyorganosiloxane composition consisting essentially of (1) 94.9 parts of an organosiloxane copolymer corresponding to the definition of ingredient A and containing 93.3 mol percent dimethylsiloxane units, 0.7 mol percent dimethylvinylsiloxane units, 2.3 mol percent trimethylsiloxy units, 3.7 mol percent monomethylsiloxy units, and exhibiting a viscosity of $1 \times 10^5$ m$^2$/s at 25° C.; (2) 5.0 parts of a dimethylhydrogensiloxy endblocked polydimethylsiloxane containing about 0.2 percent by weight of silicon-bonded hydrogen atoms (equivalent to a SiH/vinyl molar ratio of 0.85/1); and (3) 0.15 part of a reaction product of chloroplatinic acid and sym-tetramethyldivinyldisiloxane, the reaction product having been diluted with an amount of a liquid dimethylvinylsiloxy endblocked polydimethylsiloxane sufficient to provide a platinum content of 0.7 weight percent.

The heat stability of each composition was determined by placing a 100 gram portion of each composition in its own 120 cc-capacity wide-mouth glass jar measuring 6 cm in diameter. The jars were placed in an oven maintained at a temperature of 150° C. The samples remained in the oven for 1000 hours, at which time they were removed from the oven and a color rating assigned to each sample using the Gardner color scale described in ASTM test procedure D 1544, published by the American Society of Testing and Materials. The color value of a given sample is directly proportional to the extent to which the sample discolored during heating, i.e. the higher the number the greater the discoloration.

The type of amine and its concentration, expressed in percent by weight based on total weight of the curable composition, together with the Gardner color value of the cured gel at the end of the 1000 hour heating period are recorded in the following table. Amines corresponding to a heat stabilizer and color suppressant of this invention are identified by a number and those evaluated for purposes of comparison are identified by a letter in accordance with the following code.

TABLE I

| | |
|---|---|
| 1 | n-butylamine |
| 2 | triethylamine |
| 3 | diethylamine |
| 4 | N,N,N',N'—tetramethylethylenediamine |
| 5 | diethylenetriamine H$_2$NCH$_2$CH$_2$N(H)CH$_2$CH$_2$NH$_2$ |
| 6 | cyclohexylamine |
| 7 | ethylenediamine |
| A | pyridine |
| B | 3-(N,N—dibutylamino)-1-aminopropane |
| C | aniline |
| D | N—methylaniline |

| Amine | Concentration (Wt. %) | Gardner Color Rating |
|---|---|---|
| None | 0.00 | 9 |
| 1 | 0.006 | 5 |
|   | 0.06* | 9 |
| 2 | 0.009 | 6 |
|   | 0.4* | 12 |
| 3 | 0.006 | 6 |
|   | 0.01 | 7 |
| 4 | 0.005 | 4 |
| 5 | 0.003 | 4 |
|   | 0.05 | 5 |
| 6 | 0.008 | 5 |
|   | 0.4* | 18 |
| 7 | 0.003 | 4 |
|   | 0.02 | 4 |
| A | 0.007 | 12 |
| B | 0.0056 | 9 |

TABLE I-continued

| | | |
|---|---|---|
| C | 0.008 | 11 |
| D | 0.009 | 11 |

*The concentration is above the limit for the particular amine.

For purposes of comparison a curable composition outside the scope of this invention was prepared by blending the following ingredients to homogeniety.

36.3 parts of a dimethylvinylsiloxy endblocked polydimethylsiloxane having a viscosity of about 0.4 Pa.s at degrees 25 C.

0.45 parts of a trimethylsiloxy endblocked polydiorganosiloxane having an average of five methylhydrogensiloxane units and three dimethylsiloxane units per molecule and containing from 0.7 to 0.8 weight percent of silicon-bonded hydrogen atoms, 0.16 part of a reaction product of hexachloroplatinic acid and sym-tetramethyldivinyldisiloxane that has been diluted with a liquid dimethylsiloxy terminated polydimethylsiloxane in an amount sufficient to achieve a platinum content of 0.7 weight percent, and a trace amount of a blue dye.

The resultant composition was blended together with 0.006 weight percent of n-butylamine, a heat stabilizer and color suppressant of this invention, and evaluated for color development as described in the preceding section of this example. After being heated for 1000 hours at a temperature of 150° C. the color value of the sample was 11 on the Gardner scale. A sample that did not contain the amine exhibited a lighter color of 10 on the Gardner scale when heated under the same conditions, demonstrating the selectivity of the present heat stabilizers with respect to the types of organosiloxane compositions that can be stabilized.

That which is claimed is:

1. A method for imparting resistance to heat-induced discoloration to a cured unfilled organosiloxane material prepared from a curable composition comprising the product obtained by blending to homogeniety
   (A) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units;
   (B) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogen atoms per silicon-bonded vinyl radical present in said composition, and
   (C) a platinum catalyst in an amount sufficient to promote the reaction of (A) and (B), where said catalyst is metallic platinum or a reaction product of a platinum compound with an organosilicon compound,
said method comprising adding to said curable composition at least one amine of the formula $R_mNH_{(3-m)}$, $H_2NR''NH_2$, or $H_2NR''N(H)R''NH_2$ in an amount sufficient to inhibit discoloration of said cured composition at temperatures of up to about 200° C., where each R is individually selected from alkyl or cycloalkyl radicals, R'' represents alkylene and the value of m is 2 or 3.

2. A method according to claim 1 where the alkyl radicals represented by R and R' contain from 1 to 4 carbon atoms the cycloalkyl radical represented by R is cyclohexyl, R'' is ethylene or propylene and the concentration of said amine is from 0.001 to 0.05 weight percent, based on the total weight of said curable composition.

3. A method according to claim 2 where said organosiloxane copolymer contains from 87 to 94 mol percent of $(CH_3)_2SiO$ units, from 3 to 6 mol percent of $CH_3SiO_{1.5}$ units, from 2.5 to 5 mol percent of $(CH_3)_3SiO_{0.5}$ units and from 0.5 to 1 mol percent of $(CH_3)_2(CH_2=CH)SiO_{0.5}$ units, said organohydrogensiloxane is a dimethylhydrogensiloxy endblocked polydimethylsiloxane containing from 1 to 30 dimethylsiloxane units per molecule, and said platinum catalyst is a reaction product of chloroplatinic acid with an organosilicon compound.

4. In an improved, unfilled, curable organosiloxane composition which when cured exhibits a resistance to heat-induced discoloration at temperatures up to about 200° C., said composition comprising the product obtained by blending to homogeniety
   (A) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units;
   (B) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogen atoms per silicon-bonded vinyl radical present in said composition; and
   (C) a platinum catalyst in an amount sufficient to promote the reaction of (A) and (B), where said catalyst is metallic platinum or the reaction product of a platinum compound with an organosilicon compound; the improvement comprising the presence in said composition of at least one amine of the formula $R_mNH_{(3-m)}$, $H_2NR''NH_2$, or $H_2NR''N(H)R''NH_2$ in an amount sufficient to inhibit discoloration of said cured composition at temperatures of up to about 200° C., where each R is individually selected from alkyl or cycloalkyl radicals, R'' represents alkylene and the value of m is 2 or 3.

5. A composition according to claim 4 where the alkyl radicals represented by R and R' contain from 1 to 4 carbon atoms, the cycloalkyl radical represented by R is cyclohexyl, R'' is ethylene or propylene and the concentration of said amine is from 0.001 to 0.05 weight percent, based on the weight of said curable composition.

6. A composition according to claim 5 where said organosiloxane copolymer contains from 87 to 94 mol percent of $(CH_3)_2SiO$ units, from 3 to 6 mol percent of $CH_3SiO_{1.5}$ units, from 2.5 to 5 mol percent of $(CH_3)_3SiO_{0.5}$ units and from 0.5 to 1 mol percent of $(CH_3)_2(CH_2=CH)SiO_{0.5}$ units, said organohydrogensiloxane is a dimethylhydrogensiloxy endblocked polydimethylsiloxane containing from 1 to 30 dimethylsiloxane units per molecule, and said platinum catalyst is a reaction product of chloroplatinic acid with an organosilicon compound.

* * * * *